Sept. 28, 1965     PER-OSKAR PERSSON     3,208,204

ELIMINATOR FOR SEPARATION OF LIQUID FROM GAS

Filed Sept. 11, 1962

Inventor
Per-Oskar Persson
By Karl W. Flocks
attorney

United States Patent Office 3,208,204
Patented Sept. 28, 1965

3,208,204
ELIMINATOR FOR SEPARATION OF LIQUID FROM GAS

Per-Oskar Persson, Bromma, Sweden, assignor, by mesne assignments, to Frigoscandia Limited, London, England, a British company
Filed Sept. 11, 1962, Ser. No. 222,898
Claims priority, application Sweden, Sept. 22, 1961, 9,408/61
2 Claims. (Cl. 55—443)

This invention relates to an eliminator for the separation of particularly viscous liquid from gas flowing in an upward direction. According to the invention, the eliminator is at least one horizontally arranged corrugated filter. By the provision of the corrugations the liquid received by the filter will collect in the wave-troughs, thus preventing the filter from being gradually saturated with liquid, which would result in liquid breaking through the filter when this is no longer capable of retaining the collected amount of liquid. The risk of the filter being saturated is further reduced in that the filter, according to an important feature of the invention, cooperates at the wave-troughs with plates or like means which are preferably vertically arranged and which serve as discharging means for the liquid collecting in the wave-troughs.

Figure 2:
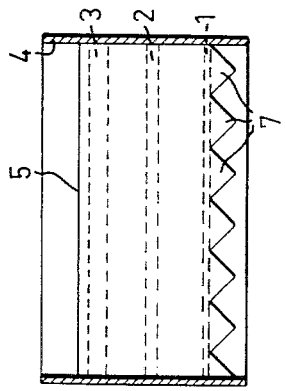
Figure 4:
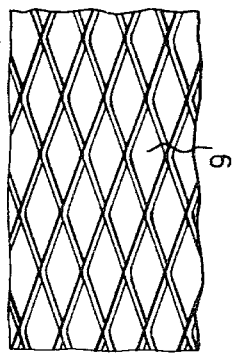
Figure 1:
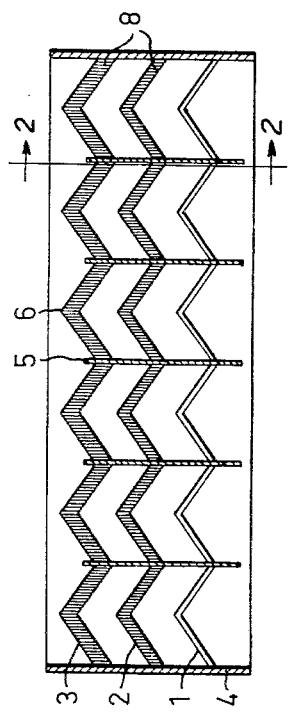
Figure 3:
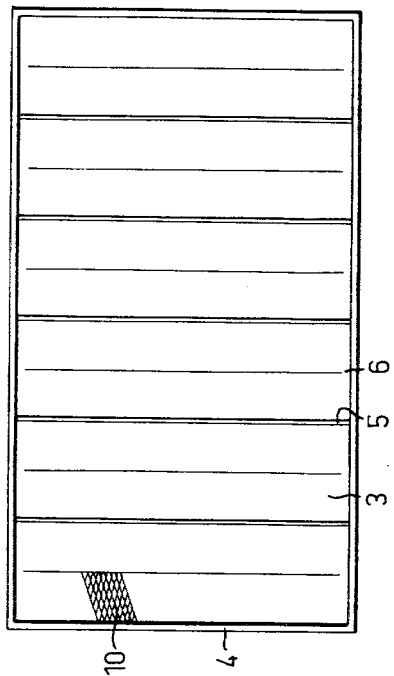

For a better understanding of the invention, an embodiment of the eliminator, chosen by way of example, will be described in more detail with reference to the accompanying drawing, in which:

FIG. 1 is a vertical longitudinal section of the eliminator;
FIG. 2 is a vertical cross section taken along line 2—2 of FIG. 1;
FIG. 3 is a plan view thereof;
FIG. 4 is a view on a larger scale of a detail of the filter.

In the embodiment shown the eliminator comprises three superimposed horizontally arranged corrugated filters 1–3. The number of the filters, however, may vary within broad limits. The filters 1–3 are mounted in a frame 4.

According to the invention, the filter 1–3 are horizontally disposed and corrugated. The filters 1–3 cooperate at the wave-troughs with vertical plates 5 which serve as discharging means for the liquid collecting in the wave-troughs.

The waves of the different filters 1–3 are situated above each other so that the plates 5 serving as discharging means can extend through all filters 1–3 at the wave-troughs thereof, as will be apparent from FIG. 1. The liquid flowing from the different filters 1–3 can thus form a continuous film at the two sides of the plates 5.

Each filter is divided by the plates 5 into several portions, each portion including a wave crest 6. In the preferred embodiment shown each portion is ridge-shaped having a top angle of about 90°.

As will be apparent from FIG. 2, the lower edges of the plates 5 are provided with teeth 7 which taper downwardly into points. The film flowing along both sides of the plates 5 therefore easily collects at the points of the teeth 7 into drops which, growing in size, readily fall off.

The superimposed horizontal filters 1–3 are of an upwardly increasing density, i.e. the filter density increases in the direction of flow of the gas.

The lowermost filter or filters may consist for instance of a pair of layers of expanded metal while the upper filter or filters may consist of a pair of layers of expanded metal with an interleaved layer 8 of some other suitable filter material, such as one or more layers of some wire netting.

The expanded metal preferably is of the nature shown in FIG. 4. Thus the apertures 9 therein are rhombic in shape. The expanded metal layers shall be so orientated that one of the acute angles of the apertures 9 are directed towards the wave-troughs, as has been indicated at 10 in FIG. 3. Such an orientation of the expanded metal layers will ensure a good flow of the liquid toward the wave-troughs. For the same purpose it is suitable to have the wires of the wire netting directed toward the wave-troughs.

According to the above embodiment shown in the drawing, the eliminator consists of several filters of a density increasing in the direction of flow of the gas. However, in another embodiment the different filters may at least as a principle be combined to a single filter of a density increasing in the direction of flow.

The eliminator according to the present invention is particularly intended for use in such fluidizing apparatus as are described in U.S. Patent No. 3,169,381. The eliminator produces an efficient separation of liquid from a flowing gas under extremely difficult conditions. Thus, the eliminator is effective where both the liquid is viscous and the air has a great speed.

While the invention has been described with particular reference to the preferred embodiment shown in the drawing, it is obvious to those skilled in the art that it may be modified in several ways within the spirit and scope of the appended claims.

What is claimed is:
1. An eliminator for the separation of liquid from a gas comprising a filter unit horizontally disposed within a path of a vertically flowing gas, said filter unit having a plurality of stacked horizontal filter members, each said filter member being horizontally corrugated along its length to provide a plurality of downwardly sloped portions, said stacked filter members having the lowest extremities of said sloped portions lying in common vertical planes, said filter members each comprising expanded metal having rhombic apertures, the expanded metal layers being oriented so that acute angles of said apertures are directed towards the lowest extremities, said horizontal filter members increasing in density in the direction of gas flow and a vertical plate lying in each of said common vertical planes for discharging condensed liquid from said filter unit.

2. The eliminator of claim 1 wherein the lower edges of the vertical plates end in teeth members which taper downwardly into points.

References Cited by the Examiner

UNITED STATES PATENTS

| 340,222 | 4/86 | Lencauchez | 55—434 |
|---|---|---|---|
| 877,460 | 1/08 | Brunner et al. | 55—464 |
| 2,490,080 | 12/49 | Melvill | 261—110 |
| 2,507,897 | 5/50 | Gavagnin | 55—423 |
| 2,602,521 | 4/52 | Smith | 55—487 |
| 2,636,572 | 4/53 | Fleisher | 55—489 X |
| 2,989,145 | 6/61 | Goodloe | 55—521 |
| 3,099,696 | 7/63 | Meek | 261—112 X |

FOREIGN PATENTS

| 222,533 | 7/59 | Australia. |
|---|---|---|
| 175,601 | 10/06 | Germany. |
| 21,449 | 5/04 | Great Britain. |

ROBERT F. BURNETT, *Primary Examiner.*
HARRY B. THORNTON, *Examiner.*